Jan. 13, 1942.  J. G. ALTHER  2,270,027
HYDROCARBON CONVERSION PROCESS
Filed Nov. 29, 1939
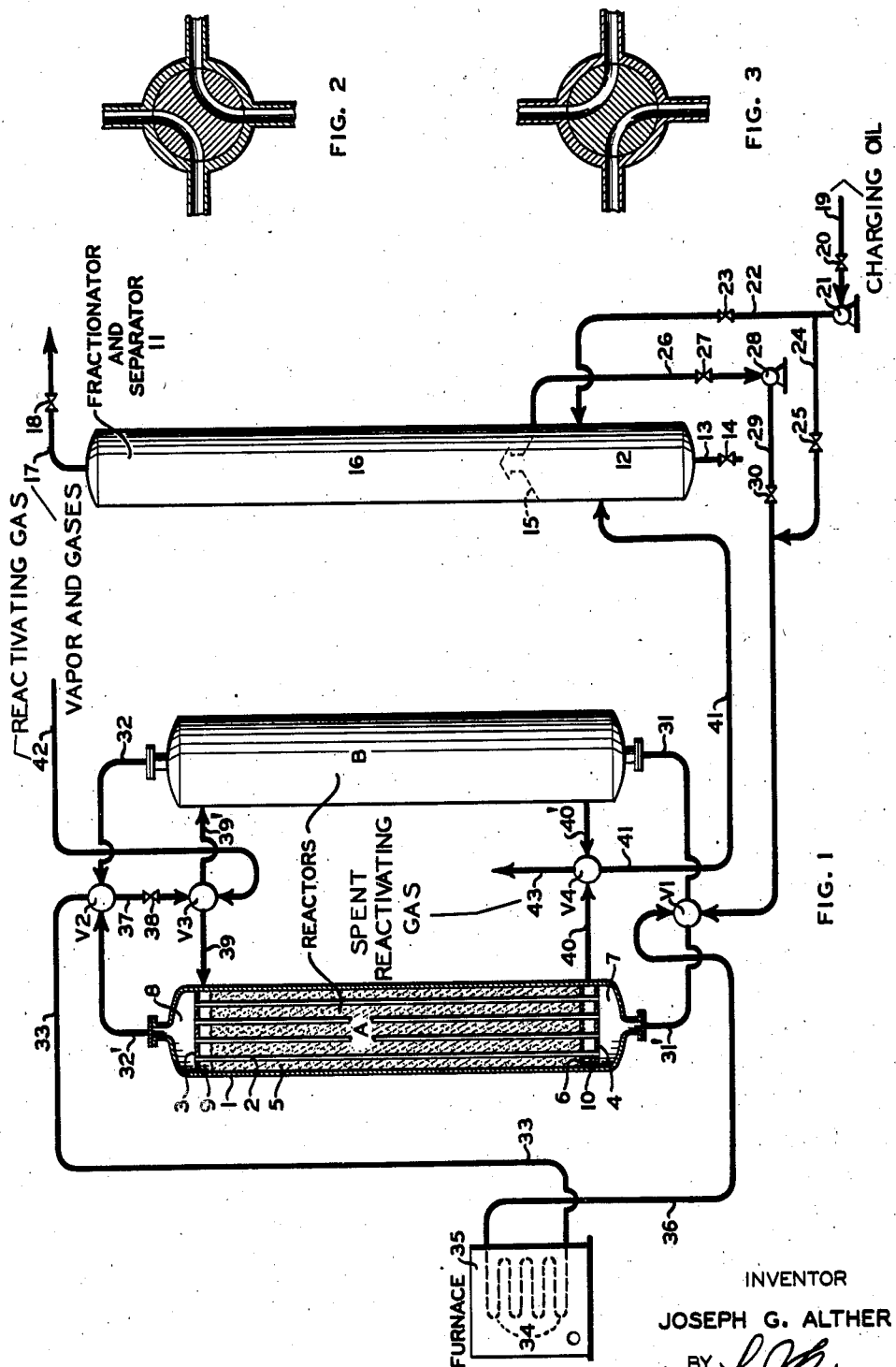
INVENTOR
JOSEPH G. ALTHER
BY *Lee J Gary*
ATTORNEY Patented Jan. 13, 1942

2,270,027

UNITED STATES PATENT OFFICE 2,270,027

HYDROCARBON CONVERSION PROCESS

Joseph G. Alther, Chicago, Ill., assignor to Universal Oil Products Company, Chicago, Ill., a corporation of Delaware Application November 29, 1939, Serial No. 306,652

7 Claims. (Cl. 196—52)

This application is a continuation-in-part of my co-pending application, Serial Number 301,554, filed October 27, 1939.

The present invention relates to an improved method and means for converting hydrocarbon oils into more valuable hydrocarbons. More specifically, it is concerned with a catalytic cracking process wherein the reactants are employed as the heat convective medium in conducting heat from the exothermic catalyst reactivating zone and supplying heat to the endothermic catalytic reaction zone.

The general procedure in the majority of catalytic treatments is to employ an extraneous material, such as combustion gases or some other suitable fluid medium, to supply heat to and conduct heat from the endothermic and exothermic reaction zones, respectively. The coefficient of heat transfer for combustion gases, which is the more commonly used heat convective medium, is relatively low as compared to other fluid media, such as molten salts, which have been employed. Combustion gases, therefore, are the least desirable as the heat convective medium from the standpoint of heat transfer, however, due to the fact that the corrosion problem when employing combustion gases rather than molten salts is less serious, they are more widely used than other heat convective media.

In order to obviate the disadvantages inherent in the systems of the type referred to above, and at the same time obtain results comparable or better than those previously obtained, my invention provides a novel and useful method and means for utilizing the materials to be converted as the fluid heat convective medium in conducting heat from the exothermic reaction zone and conveying heat to the endothermic reaction zone.

To accomplish the object of my invention, I may employ two reaction zones containing catalyst, the catalyst in one zone being contacted with vapors undergoing conversion, while the catalyst in the other zone is undergoing regeneration by contacting therewith oxygen-containing gases which are used in burning from the catalyst carbonaceous substances deposited thereon. In order to effect the desired heating and cooling in the respective reactors, I prefer to employ the hydrocarbons to be converted, first in cooling the exothermic reaction zone, subsequently, when necessary, supplying additional heat to said hydrocarbons in an external heating zone after which they are introduced to the reactor in which the endothermic conversion reaction is taking place, the heated hydrocarbons being in contact with the exterior of the endothermic reaction zone, in the first pass, for the purpose of supplying heat and, in the second pass, being in contact with the catalytic material for the purpose of effecting conversion.

In one specific embodiment the invention comprises passing reflux condensate, formed as hereinafter set forth, in contact with the exterior of an exothermic reaction zone to absorb a substantial portion of the heat produced while the catalyst contained therein is undergoing regeneration, subsequently, supplying additional heat to said reflux condensate in an external heating zone, passing the resulting highly heated reflux condensate in contact with the exterior of an endothermic reaction zone to supply the necessary heat of conversion to the hydrocarbons in contact with the catalytic material within said endothermic zone, after which said reflux condensate is subjected to contact with said catalytic material for conversion into more valuable hydrocarbons, separating the vaporous conversion products from the non-vaporous liquid residue, recovering the latter, fractionating said vaporous conversion products, together with charging oil, to separate fractionated vapors from the higher boiling hydrocarbons, recovering the former and condensing said higher boiling hydrocarbons as said reflux condensate and subjecting it to treatment as aforesaid.

The improved method herein provided for simultaneously conducting endothermic and exothermic reactions in separate zones is not limited to the use of any specific form or type of apparatus, since a great number of specific forms of apparatus may be devised which will incorporate the features of the invention. Neither is the invention limited to any specific variety of catalytic, endothermic reaction, since its advantageous features are applicable to a wide variety of specific reactions. However, to avoid confusion, the following description will be directed primarily to illustrate the features of the invention as applied to the catalytic cracking of hydrocarbon oils and to further periodic reactivation of the catalytic material employed.

In the accompanying drawing, Fig. 1 illustrates a simple form of apparatus embodying the broad features of the invention and in which the improved process provided by the invention will be conducted.

Figs. 2 and 3 are details in section of the two-way inlet and outlet valves diagrammatically indicated in Fig. 1, Fig. 2 showing a valve in one position and Fig. 3 showing the passageways therethrough shifted.

Referring now to the drawing in Fig. 1, reactors A and B are shown as comprising a cylindrical shell 1 containing a plurality of tubes 2 rolled in between upper and lower headers 3 and 4, respectively. A catalyst bed 5 surrounds the tubes and is supported by a perforated plate 6. Compartment 7 below lower tube sheet 4 and compartment 8 above upper tube sheet 3 serves as the inlet and outlet compartments, respectively, for the hydrocarbons employed as the heating or cooling medium. Compartment 9 formed between the upper tube sheet 3 and the top of the catalyst bed serves as the inlet for the hydrocarbons to be converted or for the fresh regenerating gases, while compartment 10 formed between lower tube sheet 4 and perforated plate 6 serves as the outlet for the conversion products or for spent regenerating gases.

Conversion products, formed as hereafter described, are introduced to separating zone 12 of fractionator and separator 11 and, when desired, commingled either in the separating zone or prior to its introduction to the separating zone with charging oil for the process and particularly when said charging oil contains heavy hydrocarbons too heavy to treat in the ordinary catalytic cracking treatment. In separating zone 12 the vaporous hydrocarbons are separated from the non-vaporous liquid residue and the latter removed by way of line 13 and valve 14, cooled and recovered as a product of the process or subjected to any desired further treatment. The vaporous hydrocarbons separated in zone 12 are directed through separating tray 15 into fractionating zone 16 of fractionator and separator 11 wherein vapors boiling substantially in the range of gasoline are separated from the heavier hydrocarbons and the latter condensed as reflux condensate. Fractionated vapors are removed from fractionating zone 16 by way of line 17 and valve 18, subjected to cooling and condensation in any suitable form of condensing equipment, not shown, and thereafter recovered as a product of the process. Charging oil for the process is introduced through line 19 and valve 20 to pump 21. Pump 21 discharges through line 22 and, as previously mentioned, when the charging oil contains heavy hydrocarbons, it may be introduced to separating zone 12 by directing it through valve 23 or, when desired, it may be commingled with the conversion products formed as hereinafter described, by well known means not shown, for the purpose of cooling said conversion products prior to their introduction to the separating zone. On the other hand, when the charging oil contains no heavy hydrocarbons but only hydrocarbons suitable as a cracking stock in the catalytic conversion treatment, it may be directed through line 24 and valve 25 and commingled with reflux condensate removed as hereinafter described.

Reflux condensate formed in zone 16 is directed through line 26 and valve 27 to pump 28 which discharges through line 29 and valve 30 to the first reactor of the system and thence to subsequent treatment, as will be described later.

In the particular case here illustrated, two reactors A and B are employed each containing a bed of catalytic material capable of promoting the desired cracking reaction when in a fresh or freshly regenerated state. One reactor is at all times employed as a cracking zone while the catalyst in the other reactor is being reactivated by passing therethrough a stream of hot relatively inert gases, (such as combustion gases, for example,) containing controlled amounts of air or oxygen. The reactors are alternately operated with respect to the service for which they are employed (processing and reactivation), by means of switching valves V1, V2, V3, and V4.

Any suitable valve arrangement capable of switching the direction of flow of the stream of reactants and the stream of reactivating gases may be employed within the scope of the invention, and, for the sake of simplifying the description and illustrating the process without unnecessary complications, each of the switching valves is here illustrated as a single two-way valve in which the position of the two passageways therethrough may be shifted as illustrated in Figs. 2 and 3.

Assuming that valves V1 and V3 are each adjusted to the position illustrated in Fig. 2, and valves V2 and V4 are each adjusted to the position illustrated in Fig. 3, the hydrocarbon oil in line 29 flows through valve V1 into line 31 and thence to reactor B. The hydrocarbon oil introduced to reactor B passes countercurrent to the flow of regenerating gases, introduced as hereinafter described, and in indirect heat exchange relationship therewith in order to absorb the exothermic heat of reactivation. The oil after picking up heat in reactor B is conducted through line 32 to valve V2 wherethrough it passes into line 33 by means of which it is conducted to heating coil 34. The oil acquires additional heat in passing through heating coil 34 from furnace 35. After being raised to the desired temperature in heating coil 34, the oil is conducted through line 36 to valve V1 wherethrough it passes into line 31' by means of which it is introduced to reactor A. The heated hydrocarbon oil introduced to reactor A by way of line 31' passes therethrough countercurrent to the flow of hydrocarbons undergoing conversion in contact with the catalyst mass and in indirect heat exchange relationship therewith supplying the heat of conversion to said hydrocarbons being converted.

The oil after losing some of its heat in reactor A to the hydrocarbons being converted is conducted through line 32' to valve V2 wherethrough it passes into line 37. When desired, the hydrocarbon oil while it is being used for conducting heat from one reactor and transferring that and additional heat to the second reactor may be maintained in substantially the liquid or mixed phase by means of a pressure control valve 38 in line 37. However, the use of pressure control valve 38 is optional and may be used only when desired. The hydrocarbon oil in line 37 after passing through valve 38 is preferably in substantially the vapor phase. The resulting vapors in line 37 are conducted through valve V3 into line 39 by means of which they are introduced to the compartment of reactor A containing the catalytic material.

The preferred cracking catalysts for use in the present process consist in general of a precipitated alumina hydrogel and/or zirconia hydrogel composited with silica hydrogel, the gel composite being washed, dried, formed into particles, and calcined to produce a catalyst mass. The invention, however, it not limited to these particular catalysts, for other catalysts, such as, for example, the hydrosilicates of alumina, acid treated clays, and the like, may be used within the broad scope of the invention.

In the following specification and claims the terms silica, alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia are deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of alumina and/or zirconium salts and an alkaline precipitant, such as ammonium hydroxide, ammonium carbonate or ammonium sulfide added to the solution to precipitate alumina and/or zirconia hydrogels. The final precipitate, comprising essentially hydrated silica and hydrated alumina and/or zirconia, is washed to substantially completely remove water soluble materials and dried at about 300° F. to produce a rather crumbly and granular material which may be ground and pelleted or sized to produce particles of catalyst after which the catalyst particles are calcined at a temperature in the approximate range of 1000 to 1500° F. Various other procedures, such as, for example, co-precipitation of the hydrated gels may be employed, when desired, to produce the preferred catalyst. Temperatures on the order of 800 to 1200° F. and pressures ranging, for example, from substantially atmospheric to 200 pounds or more per square inch superatmospheric may be employed when using the preferred catalyst.

The hydrocarbon vapors brought in contact with the catalyst in reactor A undergo conversion and absorb the heat of conversion in the manner previously described. The hydrocarbon conversion products from reactor A are conducted through line 40 to valve V4 wherethrough they pass into line 41 by means of which they are introduced to separating zone 12 for treatment as previously described.

With the flow of hydrocarbon vapors through reactor A, reactivating gases containing controlled amounts of oxygen or air are supplied to the system in a heated state through line 42 to valve V3 wherethrough they pass into line 39' by means of which they are introduced to the compartment of reactor B containing the catalytic material. The carbonaceous material deposited on the catalyst during the hydrocarbon conversion cycle is burned therefrom upon contact with the regenerating gases, the rate of burning being regulated by the oxygen content of the regenerating gases which is controlled to prevent the development of excessive temperatures in the catalyst bed. The heat generated in the burning reaction is conducted from the catalyst bed in the manner previously described. The spent regenerating gases leaving reactor B are conducted through line 40' to valve V4 wherethrough they pass into line 43 and may be wasted or, when desired, at least a portion may be recirculated by means of a suitable pump or compressor, not shown, to line 42 and therein commingled with controlled amounts of air or oxygen, the latter being supplied in any desired manner. In this manner the inert components of the regenerating gases may be continuously recycled through the system, but it is also within the scope of the invention, when desired, to continuously generate fresh combustion gases, for example, or steam for this purpose, by well known means not illustrated.

In the following operation, above described, when the catalyst is reactor A approaches the state of reduced activity, at which time it is advantageous to employ freshly regenerated catalyst for the treatment of the vapors, the supply of air to the regenerating gas stream is momentarily discontinued so that reactor B is purged of oxygen-containing gases, and while the oxygen-containing gases are being purged from reactor B, valve V1 is shifted to the position indicated in Fig. 3. After a short lag corresponding to the time required to drive the cooling oil from reactor B and the heating oil from reactor A, valves V2 and V3 are switched to positions corresponding to Figs. 2 and 3, respectively, and after a short lag, corresponding to the time required to remove the vapors in contact with the catalyst in reactor A and the purge gases from reactor B, valve V4 is shifted to the position illustrated in Fig. 2.

After valve V4 is shifted, air is again admitted to the regenerating gases in line 42 whereupon the catalytic material in reactor A is subjected to reactivation and the catalytic material in reactor B is utilized to promote conversion of the vapors supplied thereto. When the position of the valves are shifted, as above described, the cooling oil passes through valve V1 into valve 31' by means of which it is introduced to reactor A. The cooling oil leaving reactor A is directed through valve 32' to valve V2 wherethrough it passes into line 33. The heated oil from heating coil 34 passes through valve V1 into line 31 by means of which it is introduced to reactor B. The oil after losing some of its heat in reactor B to the materials being converted is directed through line 32 to valve V2 wherethrough it passes into line 37. The vapors in line 37 are conducted through valve V3 into line 39' and thereafter are contacted with the catalytic material in reactor B. The conversion products from reactor B are conducted through line 40' and valve V4 into line 41, the treatment thereafter being substantially as described. Fresh regenerating gases in line 42 are conducted through valve V3 into line 39 and thence into reactor A and the spent regenerating gases from reactor A are conducted through line 40 and valve V4 into line 43.

Switching of the stream of hydrocarbon vapors and reactivating gases is periodically repeated by reversing the position of the switching valves so that the partially spent catalytic material in one reactor is continuously being reactivated and the stream of hydrocarbon vapors is continuously converted in the other reactor. Preceding the change of function in each reactor, they are purged with relatively inert gases and, preferably as indicated in the foregoing description, there is sufficient delay between the switching of the various valves to prevent loss of valuable conversion products from the reactors being purged thereof and to prevent the commingling of inert gases from the reactors which have been purged with the stream of conversion products.

The switching valves may be manually operated but, preferably to simplify operation of the process and to avoid mistakes in the operation of the valves, all of the valves are preferably operated from a single time cycle controller of any well known form in accordance with a definite predetermined schedule. However, except with respect to the sequence of operation of the various valves, this is not a novel part of the present invention. For the sake of avoiding unnecessary complications, automatic control valves are not illustrated.

The results from the process embodying the features of the invention herein described that would be expected are comparable to those obtained from a process employing extraneous materials as the fluid heat convective medium. The thermal efficiency of the process, however, is greatly improved, due to the fact that a number of heat exchange steps essential in other forms of equipment are not required in the invention herein disclosed.

I claim as my invention:

1. In a catalytic process comprising endothermic and exothermic reactions conducted simultaneously in separate reaction zones, wherein the reactants are subjected to contact with a catalytic material in the endothermic reaction zone in the presence of which reaction occurs with a resulting decrease in temperature of said reactants, and wherein the catalytic material in the exothermic reaction zone is undergoing regeneration, the improvement which comprises passing said reactants first in contact with the exterior of said exothermic reaction zone to absorb excess heat generated therein, subsequently subjecting the heated reactants, while at a temperature at least that of said endothermic reaction, to contact with the exterior of said endothermic reaction zone to supply heat of reaction to the materials undergoing reaction therein, and thereafter subjecting said reactants to contact with the bed of catalytic material in said endothermic reaction zone.

2. In a process for the conversion of hydrocarbon oil comprising endothermic and exothermic reactions conducted simultaneously in separate reaction zones, wherein the reactants are subjected to contact with a catalytic material in the endothermic reaction zone in the presence of which conversion occurs with a resulting decrease in temperature of said reactants, and wherein the catalytic material in the exothermic reaction zone is undergoing regeneration, the improvement which comprises passing said reactants first in contact with the exterior of said exothermic reaction zone to absorb excess heat generated therein, subsequently heating said reactants in an external heating zone to supply additional heat thereto, passing the resulting highly heated reactants in contact with the exterior of said endothermic reaction zone to supply heat of conversion to the materials undergoing conversion therein, and thereafter subjecting said reactants to contact with the bed of catalytic material in said endothermic reaction zone for conversion therein.

3. In a process for the conversion of hydrocarbon oil comprising endothermic and exothermic reactions conducted simultaneously in separate reaction zones, wherein the reactants are subjected to contact with a catalytic material in the endothermic reaction zone in the presence of which conversion occurs with a resulting decrease in temperature of said reactants, and wherein the catalytic material in the exothermic reaction zone is undergoing regeneration, said endothermic and exothermic reaction zones being adapted for alternate utilization of the catalytic material contained therein in processing and regeneration, the improvement which comprises passing said reactants first in contact with the exterior of said exothermic reaction zone to absorb heat generated therein, subsequently heating said reactants in an external heating zone to supply additional heat thereto, passing the resulting highly heated reactants in contact with the exterior of said endothermic reaction zone to supply heat of conversion to the materials undergoing conversion therein, and thereafter subjecting said reactants to contact with the bed of catalytic material in said endothermic reaction zone as the materials to be converted therein.

4. A process for the conversion of hydrocarbon oil which comprises passing reactants, formed as hereinafter described, in contact with the exterior of an exothermic reaction zone to absorb heat produced in regenerating catalyst contained therein, subsequently subjecting the heated reactants, while at conversion temperature, to contact with the exterior of an endothermic reaction zone to supply heat of conversion to the materials subjected to contact with catalyst contained therein, thereafter subjecting said reactants to contact with the catalytic material in said endothermic reaction zone as the materials to be converted, separating the conversion products from said endothermic reaction zone into vaporous conversion products and non-vaporous liquid residue, recovering the latter, fractionating said vaporous conversion products in the presence of charging oil to separate fractionated vapors boiling in the range of gasoline from higher boiling hydrocarbons, recovering the former, condensing said higher boiling hydrocarbons as reflux condensate in the fractionating zone and subjecting it to treatment as the reactants, as hereinbefore set forth.

5. A process for the conversion of hydrocarbon oil which comprises passing reactants, formed as hereinafter described, to contact with the exterior of an exothermic reaction zone to absorb heat produced in regenerating catalyst contained therein, subsequently heating said reactants in an external heating zone to supply additional heat thereto, passing the resulting highly heated reactants in contact with the exterior of an endothermic reaction zone to supply heat of conversion to the materials undergoing conversion therein, thereafter subjecting said reactants to contact with a bed of catalytic material in said endothermic reaction zone as the materials to be converted, separating the conversion products from said endothermic reaction zone into vaporous conversion products and non-vaporous liquid residue, recovering the latter, fractionating said vaporous conversion products in the presence of charging oil to separate fractionated vapors boiling in the range of gasoline from the higher boiling hydrocarbons, recovering the former, condensing said higher boiling hydrocarbons as reflux condensate in the fractionating zone and subjecting it to treatment as the reactants, as hereinbefore set forth.

6. A process which comprises subjecting hydrocarbons to catalytic endothermic conversion in a first zone, simultaneously reactivating a catalyst by exothermic reaction in a second zone, heating hydrocarbons to be converted to conversion temperature, the heating step including passage of the last-named hydrocarbons in indirect heat exchange with said second zone to absorb heat generated by the catalyst reactivation therein, passing the thus heated hydrocarbons in indirect heat exchange with said first zone to supply heat for the endothermic conversion, and thereafter introducing the hydrocarbons to said first zone for conversion therein.

7. A process which comprises subjecting hydrocarbons to catalytic endothermic conversion in a first zone, simultaneously reactivating a catalyst by exothermic reaction in a second zone, passing hydrocarbons to be converted in indirect heat exchange with said second zone to absorb heat generated by the catalyst reactivation therein, further heating the last-named hydrocarbons to conversion temperature and then passing the same in indirect heat exchange with said first zone to supply heat for the endothermic conversion, and thereafter introducing the hydrocarbons to said first zone for conversion therein.

JOSEPH G. ALTHER.